US010295172B2

(12) United States Patent
Bowden et al.

(10) Patent No.: US 10,295,172 B2
(45) Date of Patent: May 21, 2019

(54) MULTI-PURPOSE CONTAINER AND ORGANIZER WITH LIGHT SOURCE

(71) Applicant: David P. Bowden, Spring Hill, KS (US)

(72) Inventors: David P. Bowden, Spring Hill, KS (US); Christopher S. Antoine, Wellsville, KS (US)

(73) Assignee: David P. Bowden, Spring Hill, KS (US)

( * ) Notice: Subject to any disclaimer, the term of this patent is extended or adjusted under 35 U.S.C. 154(b) by 187 days.

(21) Appl. No.: 15/237,046

(22) Filed: Aug. 15, 2016

(65) Prior Publication Data

US 2017/0045217 A1 Feb. 16, 2017

Related U.S. Application Data

(60) Provisional application No. 62/205,409, filed on Aug. 14, 2015, provisional application No. 62/235,097, filed on Sep. 30, 2015.

(51) Int. Cl.
*F21V 33/00* (2006.01)
*B65D 25/04* (2006.01)
*B65D 25/32* (2006.01)
*B65D 43/16* (2006.01)
*A01K 97/06* (2006.01)
*F21L 4/00* (2006.01)

(52) U.S. Cl.
CPC .......... *F21V 33/0084* (2013.01); *A01K 97/06* (2013.01); *B65D 25/04* (2013.01); *B65D 25/32* (2013.01); *B65D 43/16* (2013.01); *F21L 4/00* (2013.01)

(58) Field of Classification Search
CPC .......................... A01K 97/06; F21V 33/0084
USPC .............. 43/54.1, 17.5; 206/315.11; 362/154
See application file for complete search history.

(56) References Cited

U.S. PATENT DOCUMENTS

| 3,378,134 | A | * | 4/1968 | Wilkinson | A01K 97/06 206/315.11 |
|---|---|---|---|---|---|
| 4,621,308 | A | | 11/1986 | Holmberg et al. | |
| 4,691,470 | A | | 9/1987 | Landell et al. | |
| 4,756,412 | A | * | 7/1988 | Graves | A01K 97/06 206/315.11 |
| 4,999,943 | A | * | 3/1991 | Crabtree | A01K 97/06 43/54.1 |
| 5,120,016 | A | * | 6/1992 | Dysarz | A01K 97/10 248/222.13 |
| 5,333,408 | A | * | 8/1994 | Simmons | A01K 97/06 362/154 |
| 5,611,170 | A | | 3/1997 | McGuff et al. | |
| 5,659,995 | A | * | 8/1997 | Hoffman | A01K 97/06 220/504 |

(Continued)

*Primary Examiner* — Lisa L Tsang
(74) *Attorney, Agent, or Firm* — Law Office of Mark Brown, LLC; Christopher M. DeBacker

(57) ABSTRACT

A multi-purpose container and organizer for storing fishing tackle and other fishing gear or for any other suitable use. A light source is placed at the core of the container. The container is made of a semi-translucent material such that when the light source is activated, the light from the light source shines through the material of the container, lighting up the items stored within the container and providing gentle illumination to the surrounding area. The light source is removable from the container for a brighter, more concentrated light source.

8 Claims, 9 Drawing Sheets

(56) References Cited

U.S. PATENT DOCUMENTS

| | | | | |
|---|---|---|---|---|
| 5,685,421 A * | 11/1997 | Gilmore | ............... | A45C 15/06 |
| | | | | 16/405 |
| 5,802,760 A * | 9/1998 | Campbell | ............... | A01K 97/06 |
| | | | | 206/315.11 |
| 5,813,528 A * | 9/1998 | Bliek | ............... | A01K 97/06 |
| | | | | 206/315.11 |
| 7,055,983 B1 | 6/2006 | Baker et al. | | |
| 8,534,632 B1 * | 9/2013 | Mancuso, Jr. | ......... | A01K 97/20 |
| | | | | 248/146 |
| 8,806,803 B1 * | 8/2014 | Mitchell | ............... | A01K 97/06 |
| | | | | 206/315.11 |
| 2015/0109766 A1 | 4/2015 | Gibbs et al. | | |
| 2015/0230444 A1 * | 8/2015 | Green | ............... | A01K 89/08 |
| | | | | 43/17.5 |
| 2015/0272104 A1 * | 10/2015 | Shaw, Jr. | ............... | A01K 97/10 |
| | | | | 43/21.2 |
| 2016/0000055 A1 * | 1/2016 | Best | ............... | A01K 69/10 |
| | | | | 43/17.5 |

* cited by examiner

MULTI-PURPOSE CONTAINER AND ORGANIZER WITH LIGHT SOURCE

CROSS-REFERENCE TO RELATED APPLICATION

This application claims priority in U.S. Provisional Patent Application No. 62/205,409, filed Aug. 14, 2015, and also in U.S. Provisional Patent Application No. 62/235,097, filed Sep. 30, 2015, both of which are incorporated herein by reference.

BACKGROUND OF THE INVENTION

1. Field of the Invention

The present invention relates generally to a container having a light source, and more specifically to a fishing accessory container and organizer having a removable light source within its core, the container being made of semi-translucent or clear material.

2. Description of the Related Art

Fishing is often best performed in the pre-dawn hours or even late at night. However, these times also require a source of light for the fisherman to see his gear and to find his way to the water. Head lamps and flashlights are added costs which can scare fish away when shone directly into the water. Light is necessary when fishing early in the morning, but can be detrimental if the fish are scared away from the source.

What is needed is a system for storing fishing gear while producing a soft light for the fisherman to use, while ensuring fish are not scared away by the light. A self-contained unit would be superior to carrying multiple individual items.

Heretofore there has not been available a multi-purpose container with the advantages and features of the present invention.

BRIEF SUMMARY OF THE INVENTION

The present invention generally provides a multi-purpose container and organizer for storing fishing tackle and other fishing gear or for any other suitable use. A light source is placed at the core of the container. The container is made of a semi-translucent material such that when the light source is activated, the light from the light source shines through the material of the container, lighting up the items stored within the container and providing gentle illumination to the surrounding area. The light source is removable from the container for a brighter, more concentrated light source.

The container may include multiple removable container units which snap to or otherwise connect with the core container unit. The container may also include sliding or hinged drawers or doors for accessing containment units. A carrying handle is placed on the top of the container unit for easy transport. The light source may be of any size or shape, and may include existing light sources which are simply inserted in a hollow core of the device.

This device may have uses outside of fishing, such as for use in aircrafts, for medical first responders, home emergency kits, cosmetics, hobbies and crafts, building construction contractors, camping, or any other feasible utility.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Multi-Purpose Container and Organizer 2 Including a Lighting Element 10

Figure 1:
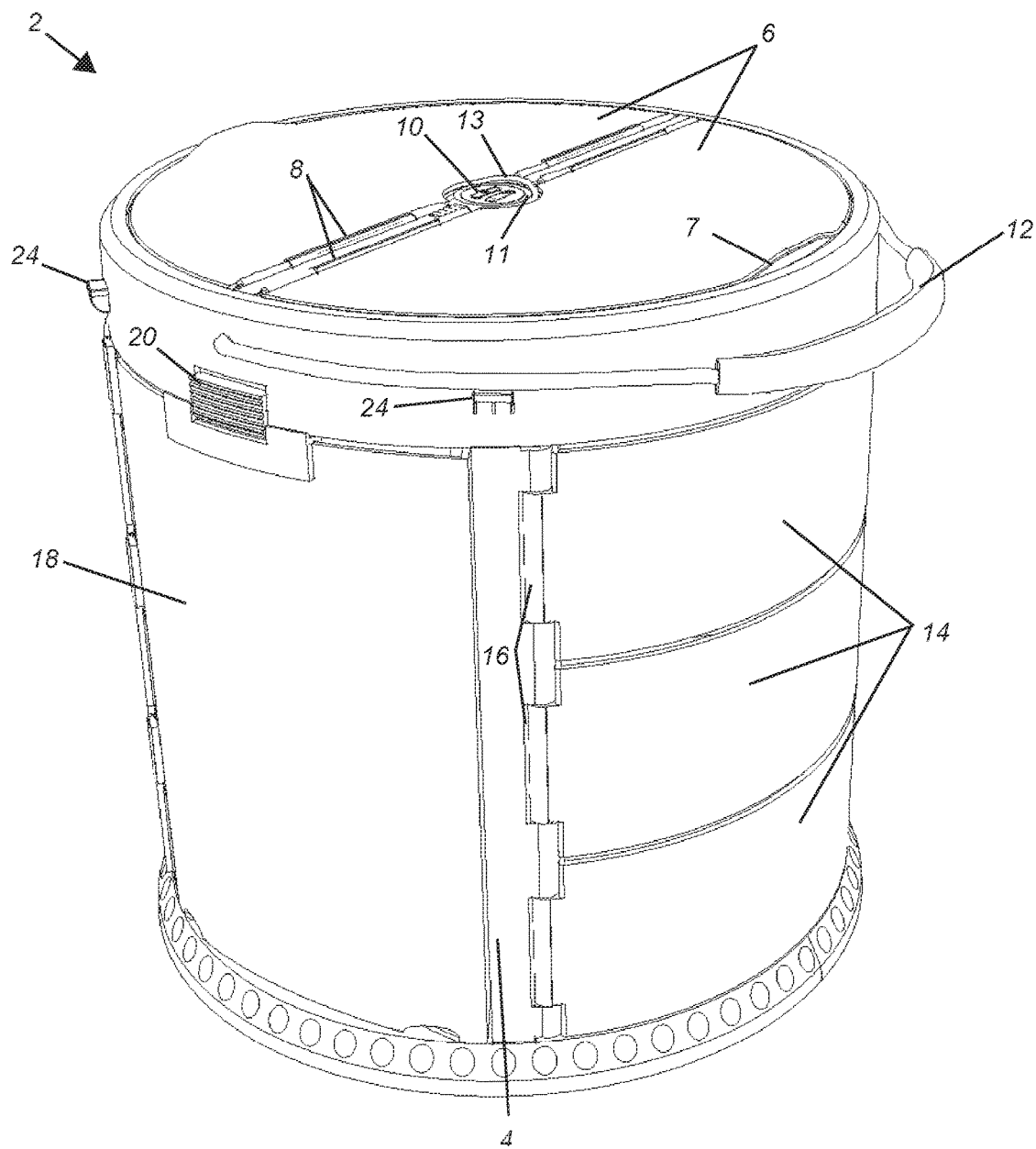
FIG. 1 is a three-dimensional isometric view of a preferred embodiment of the present invention in a closed condition.
Figure 5:
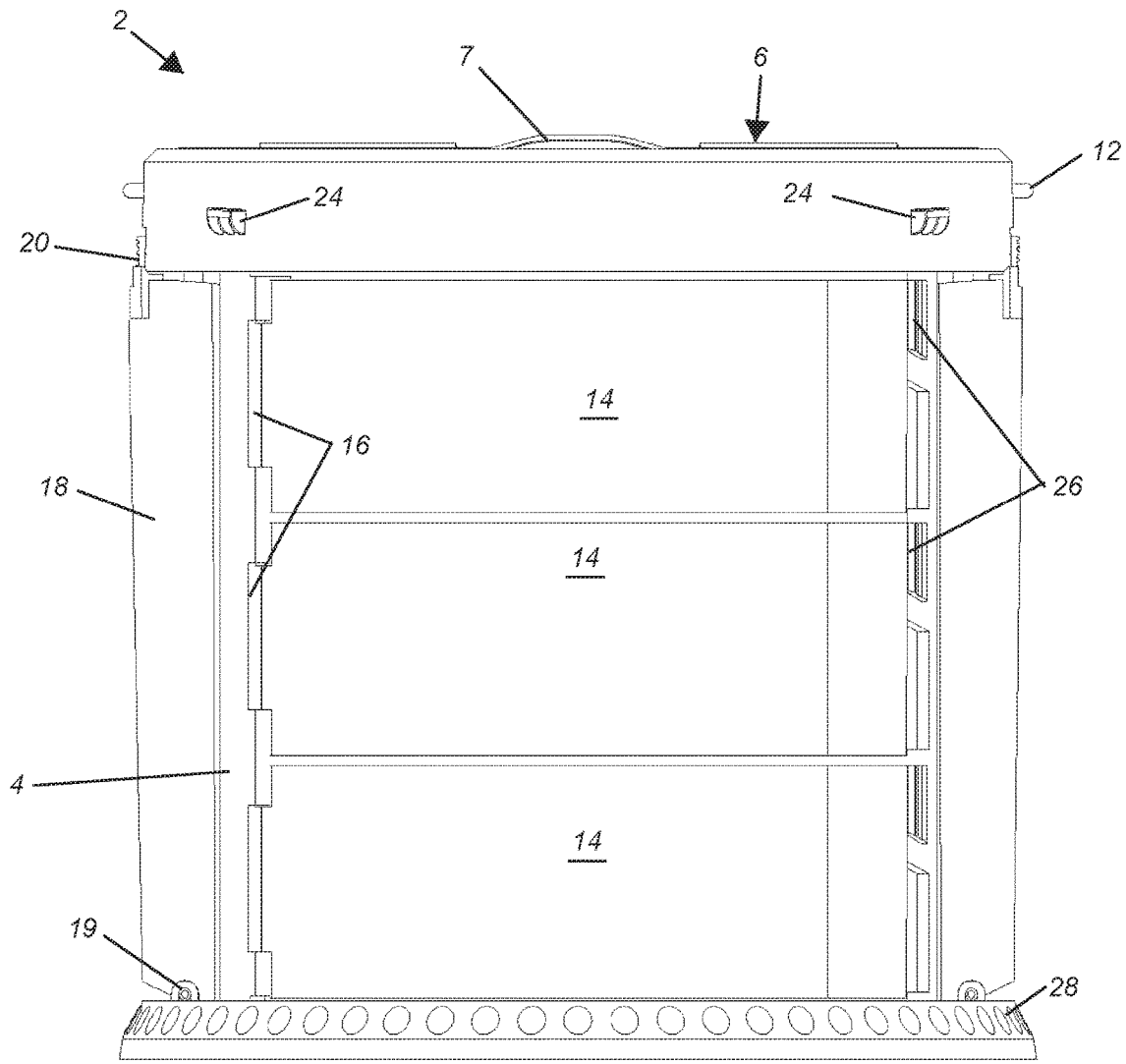
FIG. 5 is a right-side elevational view thereof.
Figure 6:
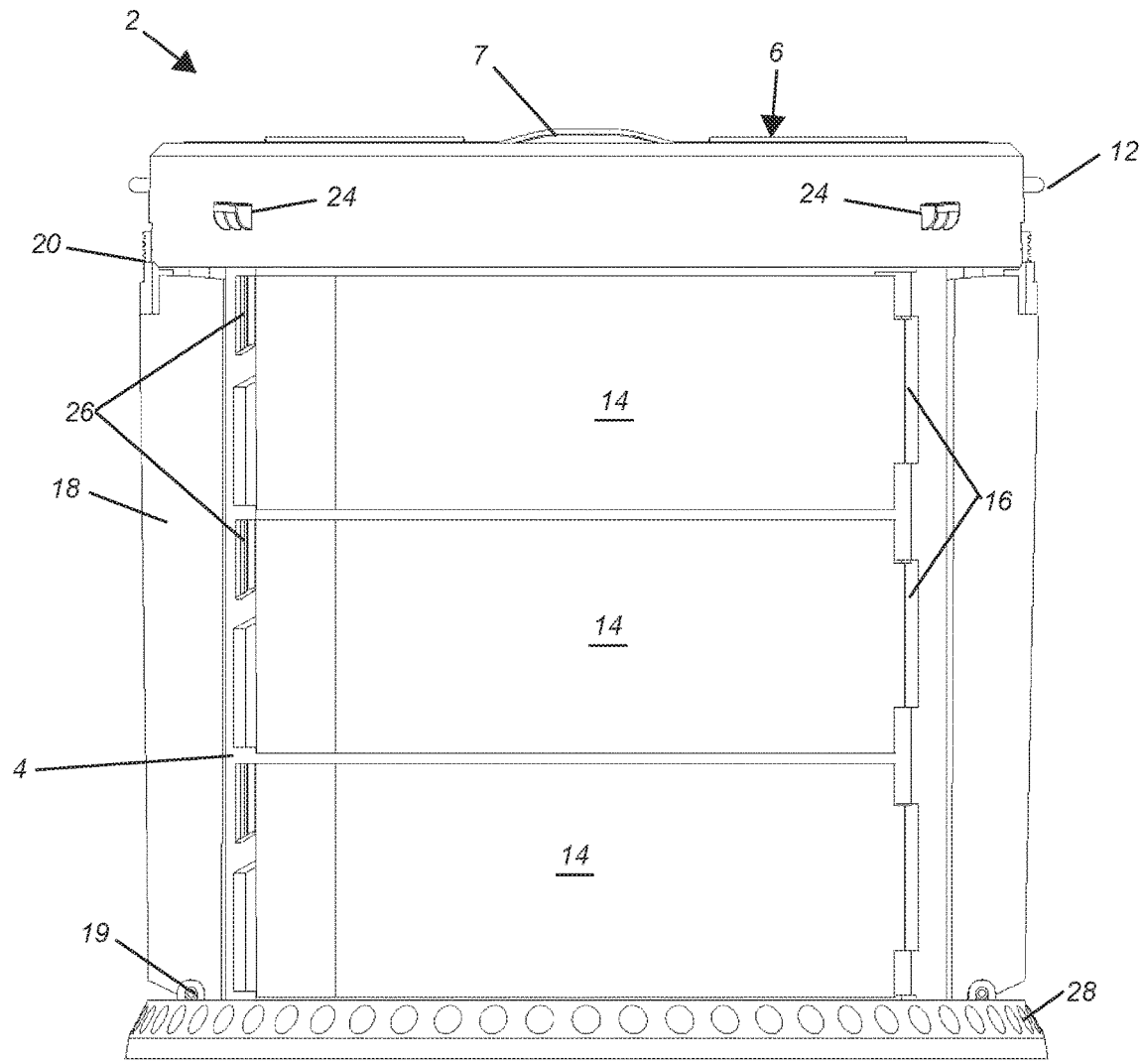
FIG. 6 is a left-side elevational view thereof.
Figure 7:
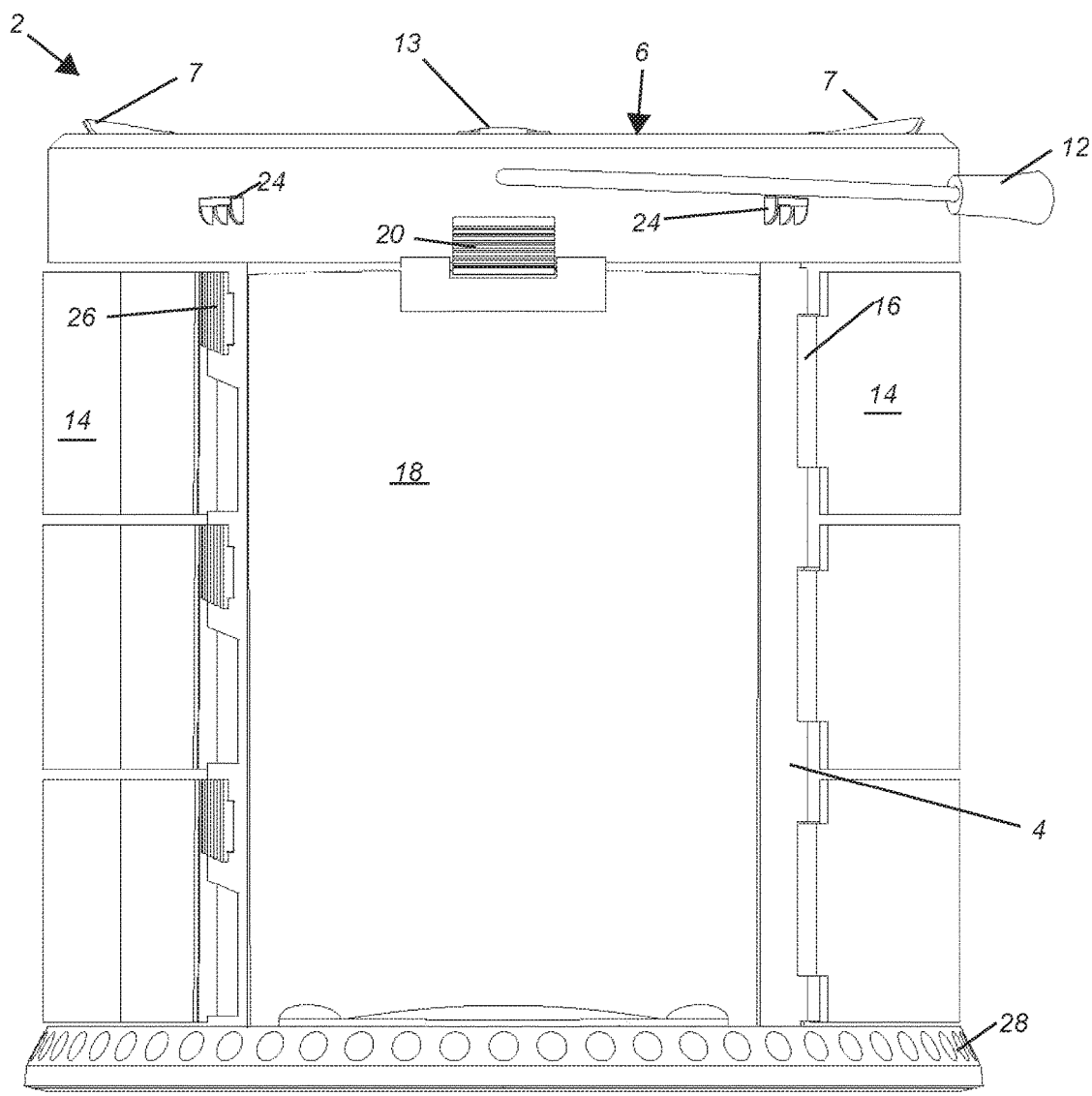
FIG. 7 is a front elevational view thereof.
Figure 8:
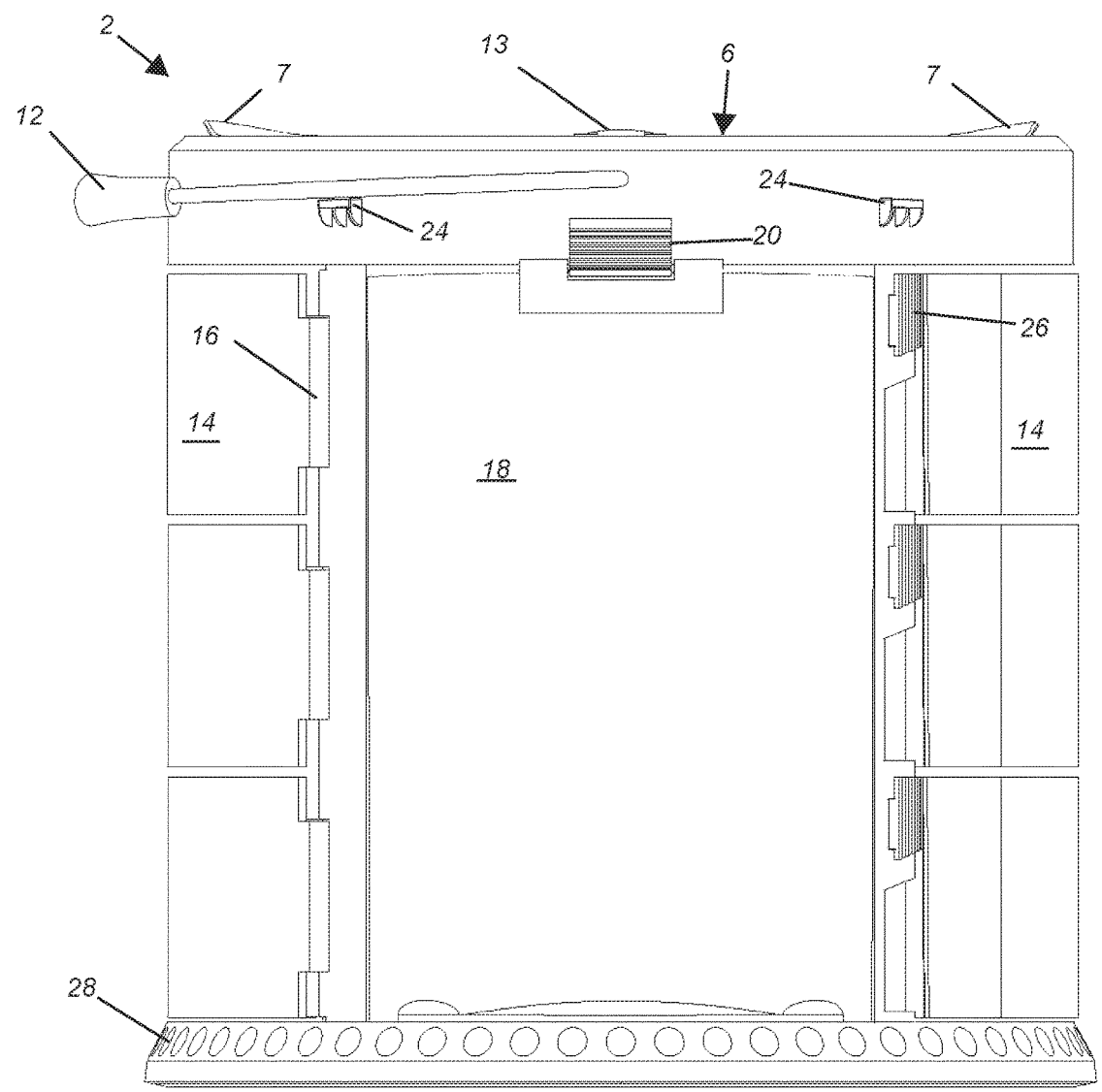
FIG. 8 is a rear elevational view thereof.
Figure 9:
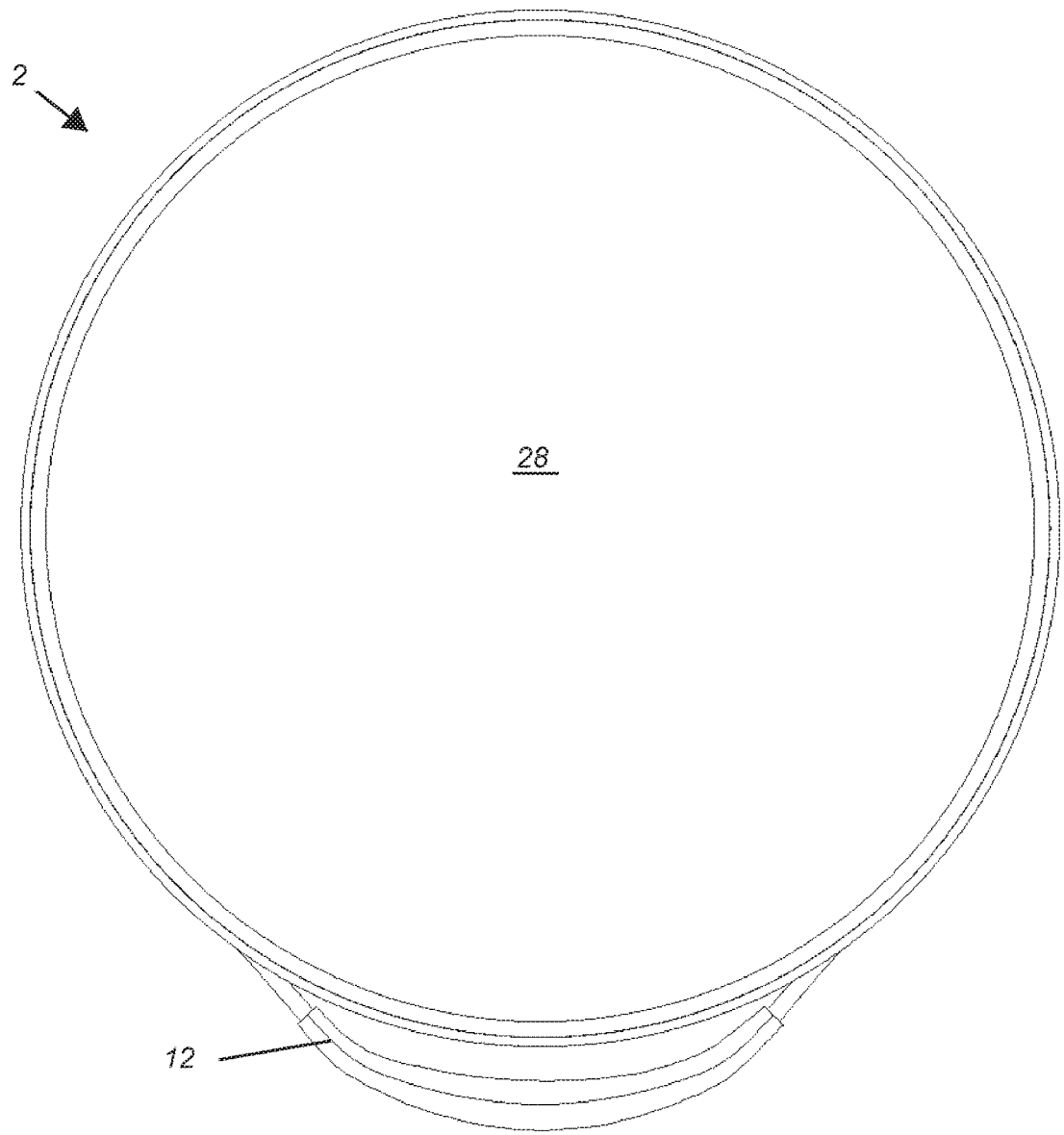
FIG. 9 is a bottom plan view thereof.

Referring to the figures, a multi-purpose container 2 is shown in FIG. 1 in a closed position. The body 4 of the container includes several side drawers 14 and side bin 18. A pair of lids 6 is hingedly affixed to the container via lid hinges 8. A light source 10 is inserted into the top of the container 2 within a light insert 11. A handle 12 is connected to an upper portion of the container body 4 and is kept from dropping below a horizontal orientation by several handle stops 24 located around the lids 6. The side drawers 14 are connected to the body 4 by drawer hinges 16 and secured closed by drawer latches 26 as shown in FIGS. 5-8. The bins 18 are similarly hingedly connected to the body by a bin hinge 19 as shown in FIG. 5, and the bins 18 are secured to the body 4 by a bin latch 20. The base 28 of the container functions as a tip-stabilizer which prevents the container for being knocked over while in use. In a preferred embodiment, as shown, it is slightly flared away from the body 4 of the container 2.

Figure 2:
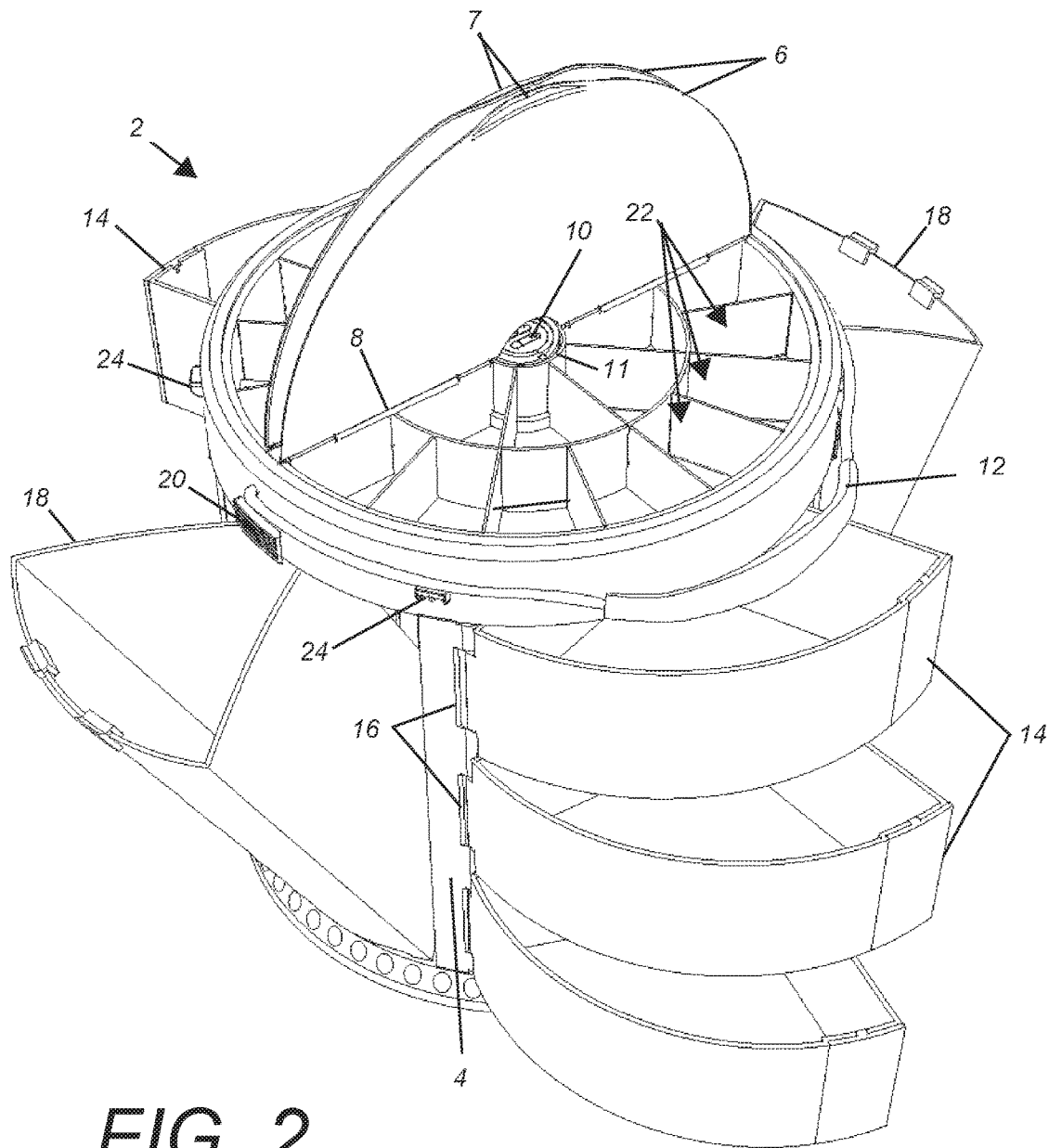
FIG. 2 is a three-dimensional isometric view thereof shown in an opened condition.

FIG. 2 shows the container 2 in an open orientation where the lids 6 are lifted open by the lid grip 7 revealing several storage compartments 22 covered by the lids 6. The bins 18 and drawers 14 are similarly shown in their open orientation.

Figure 3:
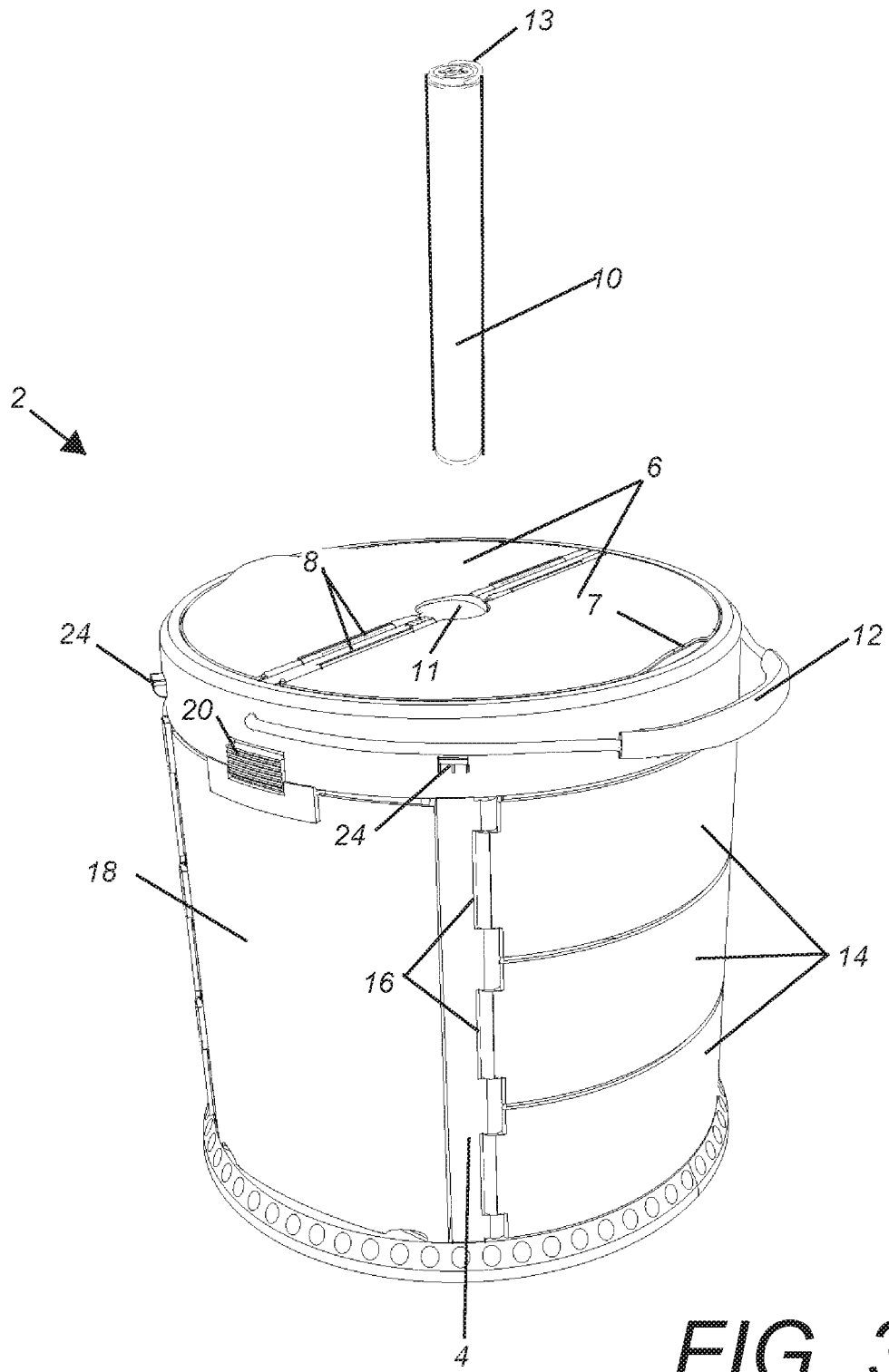
FIG. 3 is a three-dimensional isometric view thereof showing a removable light source element.
Figure 4:
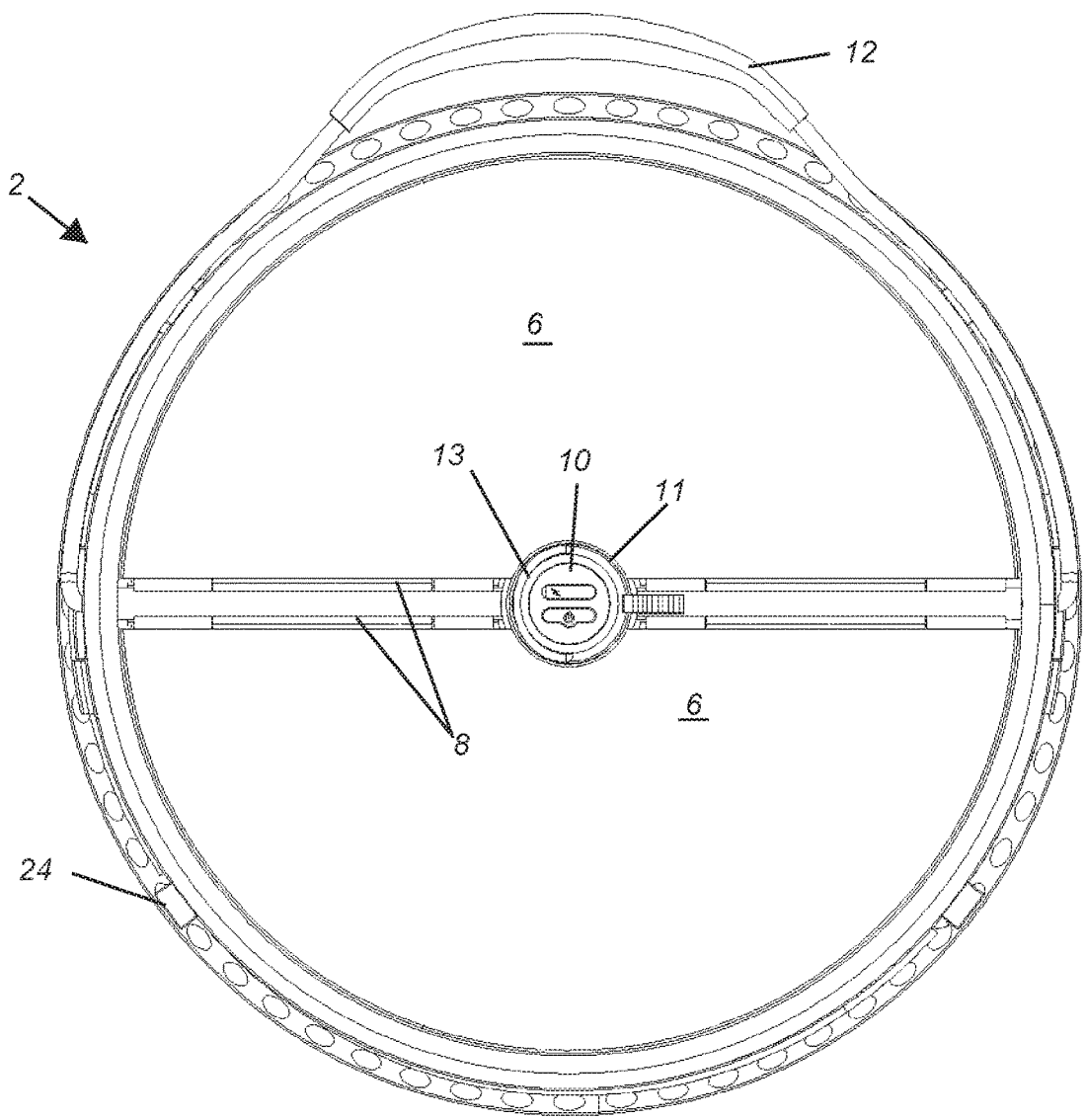
FIG. 4 is a top-plan view of the preferred embodiment of the present invention of FIG. 1.

FIG. 3 shows the light source 10 removed from the light insert 11 of the container 2. The light source includes a light ring 13 which allows a user to grip the light and pull it out of the container to replace it or use it in an exterior lighting situation. When turned on while inserted into the container, the light will permeate through the body 4, bins 18 and drawers 14 of the container 2 which are constructed from a semi-translucent plastic material. This allows for a soft glow of light. The light source 10 could be locked into place within the bucket by utilizing a spring-loaded element placed in the base of the bucket which engages the bottom end of the light, and a latch which automatically locks into place against the light as it presses down against the spring-loaded element. When the latch is manually released, the spring-loaded element pops the light source 10 up slightly out of the top of the container. Other optional locking elements could include a simple twist-and-lock engagement or other standard locking arrangements.

The latches 20, 26 for the bins 18 and drawers 14, respectively, could be of any suitable design to temporarily lock the bins and drawers. They could slide up or away from the bin or drawer; they could be on a hinge; or they could snap against the bin or drawer. Preferably, the latch would automatically receive and lock in place the bin 18 or drawer 14 when the bin or drawer is closed without needing to actively activate the latch. Another optional feature would be a magnet within the latches and/or the bins and drawers which facilitates the closing of the respective bin or drawer.

The primary purpose of such a container 2 is for use with fishermen fishing in early morning or other low light places and times. The various compartments 22 can store bait and tackle, while the larger drawers 14 and bins 18 can be used for storing other equipment or even caught fish. Other uses of this container are innumerable; it could be used to store tools and screws, nails, etc. for construction jobs; it could be used for camping; it could be used to store cleaning materials.

The light source 10 could be a lantern or other light source having a rechargeable battery power supply or could be powered using disposable batteries. Other options would be a chemical glow stick, a solar-charged light source, a hand-cranked power supplied light source, or even a wired power supplied light source. The light source could be colored or simply white.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A container system comprising:
a cylindrical body including a sidewall, a bottom face and a top end;
a plurality of storage compartments located within said top end;
a lid connected to said cylindrical body at said top end and above said plurality of storage compartments, said lid configured to be transformed from a first, closed position whereby said plurality of storage compartments are inaccessible, to a second position whereby said plurality of storage compartments are accessible;
a light insert located within said top end and said lid, said light insert containing a light source;
said light source comprising a power source, and wherein said light source is selectively removable from said light insert;
said light source extending almost entirely through said cylindrical body within said light insert and thereby emitting light radially outward from within said cylindrical body;
a handle connected to said cylindrical body in proximity to said top end;
a plurality of drawers inserted into said sidewall and connected to said sidewall via respective hinges, whereby said drawers are configured to be opened away from said cylindrical body about said hinges; and
a bin inserted into said sidewall, said bin connected to said sidewall via a hinge located near said bottom face of said cylindrical body, whereby said bin is configured to be opened away from said cylindrical body about said hinge.

2. The container system of claim 1, further comprising:
said light source being a cylindrical light source having a light handle configured for permitting selectable removal of said light source from said light insert.

3. The container system of claim 1, further comprising:
wherein said cylindrical body is comprised of a semi-translucent material, said plurality of drawers are comprised of a semi-translucent material, and said bin is comprised of an at least semi-translucent material; and
whereby said light source is configured to be activated within said light insert, thereby transmitting light through the semi-translucent material of said cylindrical body, said plurality of drawers, and said bin.

4. The container system of claim 1, further comprising:
wherein said lid comprises two hinged portions hingedly connected to said cylindrical body along a central axis about said top end;
wherein said light insert is located between said two hinged portions; and
wherein each of said two hinged portions may be opened exclusive of the other.

5. The container system of claim 1, further comprising:
said light insert configured to be cylindrical;
said light source configured to be cylindrical;
a light source latch located at a top end of said light insert, said latch configured to automatically lock said light source within said light insert; and
a spring-loaded release located at a bottom end of said light insert, said spring-loaded release configured to move said light source upward within said light insert upon release of said light source latch.

6. The container system of claim 1, further comprising:
said light insert configured to be cylindrical;
said light source configured to be cylindrical; and
said light source configured to be twisted into a locked position within said light insert.

7. The container system of claim 1, further comprising:
a tip stabilizer located about said bottom face of said cylindrical body; and
wherein said tip stabilizer flares away from said cylindrical body to provide a tip-resistant base.

8. A container system comprising:
a cylindrical body including a sidewall, a bottom end and a top end, wherein said bottom end includes a bottom face and a flared tip stabilizer;
a plurality of storage compartments located within said top end;
a pair of lids connected to said cylindrical body at said top end and above said plurality of storage compartments, said lids configured to be transformed from a first, closed position whereby said plurality of storage compartments are inaccessible, to a second, open position whereby said plurality of storage compartments are accessible;

a light insert located centrally within said top end and located between said pair of lids, said light insert containing a light source;

said light source comprising a power source, and wherein said light source is selectively removable from said light insert;

said light insert configured to be cylindrical;

said light source configured to be cylindrical;

said light source extending almost entirely through said cylindrical body within said light insert and thereby emitting light radially outward from within said cylindrical body;

a light source latch located at a top end of said light insert, said latch configured to automatically lock said light source within said light insert;

a spring-loaded release located at a bottom end of said light insert, said spring-loaded release configured to move said light source upward within said light insert upon release of said light source latch;

a handle connected to said cylindrical body in proximity with said top end;

a plurality of drawers inserted into said sidewall and connected to said sidewall via respective hinges, whereby said drawers are configured to be opened away from said cylindrical body about said hinges;

a bin inserted into said sidewall, said bin connected to said sidewall via a hinge located near said bottom face of said cylindrical body, whereby said bin is configured to be opened away from said cylindrical body about said hinge;

wherein said generally cylindrical body, said plurality of drawers, and said bin are comprised of an at least semi-translucent material; and whereby said light source is configured to be activated within said light insert, thereby transmitting light through the semi-translucent material of said cylindrical body, said plurality of drawers, and said bin.

* * * * *